(12) United States Patent
Bouiller et al.

(10) Patent No.: US 7,224,082 B2
(45) Date of Patent: May 29, 2007

(54) TURBOMACHINE INCLUDING AN INTEGRATED ELECTRICITY GENERATOR

(75) Inventors: Philippe Bouiller, Samoreau (FR); Serge Morreale, Guignes (FR); Stephane Rousselin, Hericy (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 11/282,669

(22) Filed: Nov. 21, 2005

(65) Prior Publication Data

US 2006/0108807 A1 May 25, 2006

(30) Foreign Application Priority Data

Nov. 25, 2004 (FR) .................................. 04 12504

(51) Int. Cl.
*H02P 9/00* (2006.01)

(52) U.S. Cl. ....................................................... 290/52

(58) Field of Classification Search ...................... None
See application file for complete search history.

(56) References Cited

U.S. PATENT DOCUMENTS

| | | | |
|---|---|---|---|
| 4,799,354 A * | 1/1989 | Midgley ....................... | 60/788 |
| 5,237,817 A | 8/1993 | Bornemisza et al. | |
| 5,376,827 A * | 12/1994 | Hines ........................... | 290/52 |
| 6,314,717 B1 * | 11/2001 | Teets et al. .................... | 60/804 |
| 6,378,293 B1 * | 4/2002 | Care et al. .................. | 60/226.1 |
| 6,914,344 B2 * | 7/2005 | Franchet et al. .............. | 290/52 |
| 2006/0101404 A1 * | 5/2006 | Popp et al. .................. | 717/124 |

FOREIGN PATENT DOCUMENTS

| | | |
|---|---|---|
| EP | 1 382 802 A1 | 1/2004 |
| FR | 1 367 893 | 7/1964 |
| GB | 1141001 | 1/1969 |
| WO | WO 02/37046 A2 | 5/2002 |
| WO | WO02/037046 A3 * | 5/2002 |
| WO | WO 2005059316 A1 * | 6/2005 |
| WO | WO 2005073519 A1 * | 8/2005 |

* cited by examiner

*Primary Examiner*—Joseph Waks
(74) *Attorney, Agent, or Firm*—Oblon, Spivak, McClelland, Maier & Neustadt, P.C.

(57) ABSTRACT

A turbomachine includes a high-pressure spool, an axial compressor of axis X mounted on a rotor and including a casing and at least one rear bearing disposed between the casing and the rotor of the compressor. The turbomachine further includes an electricity generator coaxial with the spool and including a primary magnetic circuit that is constrained to rotate with the rotor of the compressor and a secondary magnetic circuit that is secured to the casing. The electricity generator is disposed upstream from the rear bearing and includes at least a first cooling circuit surrounding the secondary magnetic circuit and extended by a nozzle for lubricating the rear bearing.

20 Claims, 2 Drawing Sheets

TURBOMACHINE INCLUDING AN INTEGRATED ELECTRICITY GENERATOR

The invention relates to a turbomachine, and more particularly to a turbojet that includes an integrated electricity generator coaxial with the shaft of the turbomachine.

BACKGROUND OF THE INVENTION

In a conventional engine, the accessory box fitted with fuel pumps, bearing lubricant pumps, hydraulic pumps for controlling various members, electricity generators, and the starter, is located outside the engine and receives power taken from the engine by means of a radial shaft and angle takeoffs.

Over the years, the increases in the compression ratios and in the inlet temperatures to the turbine, and also the improvements in materials and efficiency, have led to a constant reduction in the size of engines so as to obtain an ever increasing ratio of weight/thrust, and this applies both to civilian applications and to military applications.

The power takeoff system and the accessory box have had difficulty in following this progress correspondingly, and they thus represent a large fraction of the volume and the weight of an engine, in particular of a low-thrust engine which is therefore small in size, particularly when the accessory box, generally placed on the engine casing, supports an air starter and an electricity generator that are separate.

The use of small engines, that are ever simpler and less expensive, for the purpose of propelling training airplanes, observation or attack drones, and cruise missiles, requires engine manufacturers also to make such engines more furtive. This can be attempted by greatly reducing their frontal surface area, which also achieves a significant saving in drag, making it possible to increase the flying time or the range of aircraft or of remotely controlled vehicles fitted with such engines. In order to reduce both weight and the frontal surface area of engines, it thus appears to be desirable to envisage integrating an electrical generator-starter in the engine and to eliminate the use of mechanical connections so that the interface between the engine and the accessories relies on electrical transmission.

With wide-bodied aircraft, having electrical or electrohydraulic flight controls in ever greater numbers, and also with radar, advanced warning, and electronic surveillance airplanes, electrical power requirements are large. The engines of such airplanes are fitted with booster or auxiliary generators, thus increasing the size of the auxiliary boxes, and also their weight in order to be able to carry the generators. In an engine having a large bypass ratio, it is therefore advantageous to integrate an auxiliary generator in addition to the generator-starter in the engine in order to reduce the size and the weight of the angle takeoff, or indeed in order to eliminate them, thereby obtaining a thinner cowl, by housing some of the electrically-driven accessories in the pylon.

In the prior art, integrating a generator inside the engine leads to using a cooling oil circuit specific to the generator in order to cool its coils, or indeed its magnets.

That increases the number of pieces of equipment (oil pipes and pumps) inside the engine, and also complicates access to the generator for maintenance purposes.

OBJECTS AND SUMMARY OF THE INVENTION

An object of the present invention is to provide a turbomachine arrangement enabling the drawbacks of the prior art to be overcome, and in particular making it possible to optimize the path followed by the oil between lubricating the bearings and cooling the generator.

To this end, the engine provides a turbomachine comprising a high-pressure spool, an axial compressor of axis X mounted on a rotor and comprising a casing and at least one rear bearing disposed between the casing and the rotor of said compressor, said turbomachine further comprising an electricity generator coaxial with said spool and including a primary magnetic circuit (or rotor) that is constrained to rotate with said rotor of the compressor and a secondary magnetic circuit (or stator) that is secured to said casing.

According to the present invention, in the turbomachine, said electricity generator is disposed upstream from said rear bearing and includes at least a first cooling circuit surrounding said secondary magnetic circuit and extended by a nozzle for lubricating said rear bearing.

It will thus be understood that by placing the first cooling circuit of the electricity generator in the lubrication circuit of the turbomachine, the electricity generator is integrated without significantly complicating the oil equipment.

Preferably, the turbomachine further comprises a combustion chamber, and upstream from said combustion chamber, said spool presents said axial compressor of axis X for delivering air to said chamber, and downstream from said chamber, said spool presents a turbine for receiving hot gas from said combustion chamber for driving the rotor of said compressor in rotation, said compressor comprising a plurality of compression stages, each stage presenting a ring of stationary blades secured to said casing and a ring of moving blades extending radially from the periphery of a disk of said rotor.

In another advantageous disposition of the present invention, it is also possible in accordance with the present invention to integrate an electricity generator in a turbomachine of a second type that further comprises a low-pressure spool having a low-pressure compressor disposed upstream from the high-pressure spool, and a low-pressure turbine disposed downstream from the high-pressure spool and serving to drive the rotor of said high-pressure compressor in rotation, said compressor comprising a plurality of compression stages each presenting a ring of stationary blades and a ring of moving blades extending radially from the periphery of a respective disk of said rotor. In which case, said turbomachine of the second type further comprises an intermediate casing disposed between the low-pressure compressor and the higher pressure compressor, the secondary magnetic circuit of the electricity generator is secured to said intermediate casing, and said rear bearing is mounted on said intermediate casing.

In the context of the present invention, either said electricity generator is configured to operate as a starter, or else said electricity generator is configured to operate as an auxiliary generator, or indeed the turbomachine has two electricity generators, one constituting a starter and the other an auxiliary generator.

For a turbomachine of the second type, in another preferred disposition, the turbomachine further comprises at least one front bearing disposed between said intermediate casing and the rotor of said low-pressure compressor, upstream from said electricity generator, and said first cooing circuit is in communication with the lubricating oil circuit of said front bearing.

In the context of the preceding paragraph, the turbomachine of the second type preferably further comprises a second cooling circuit surrounding said primary magnetic circuit and fed by the feed means connected to the first cooling circuit, said second cooing circuit opening out in the vicinity of said front bearing. In which case, advantageously, said feed means of the second cooling circuit comprise a lubrication nozzle that, together with said nozzle for lubricating the rear bearing, constitutes a two-headed nozzle.

In another advantageous disposition, said secondary magnetic circuit is mounted on a cylindrical support, said primary magnetic circuit is mounted on a cylindrical support, and annular sealing means are disposed between the ends of said cylindrical supports, thereby making said electricity generator proof against the lubricating oil atmosphere that surrounds it.

Advantageously, said first cooling circuit comprises a first series of helical channels.

Also preferably, said second cooling circuit comprises a second series of helical channels.

The dispositions of the invention make it possible to envisage an aeroengine in which the accessories are driven by electric motors powered by the electricity generators integrated in the engine, thus making it possible to eliminate the mechanical connections and the angle takeoffs, to reduce the weight of the engine, and to thin down the cowl of a turbojet having a large bypass ratio.

It is also most advantageous to minimize the weight of the accessory box on large engines since that makes it possible to reduce radial loads in the event of a high level of unbalance on losing fan blades, and makes it possible to obtain an intermediate case of reduced weight.

BRIEF DESCRIPTION OF THE DRAWINGS

Other advantages and characteristics of the invention appear on reading the following description made by way of example and with reference to the accompanying drawings, in which.

MORE DETAILED DESCRIPTION

Figure 1:
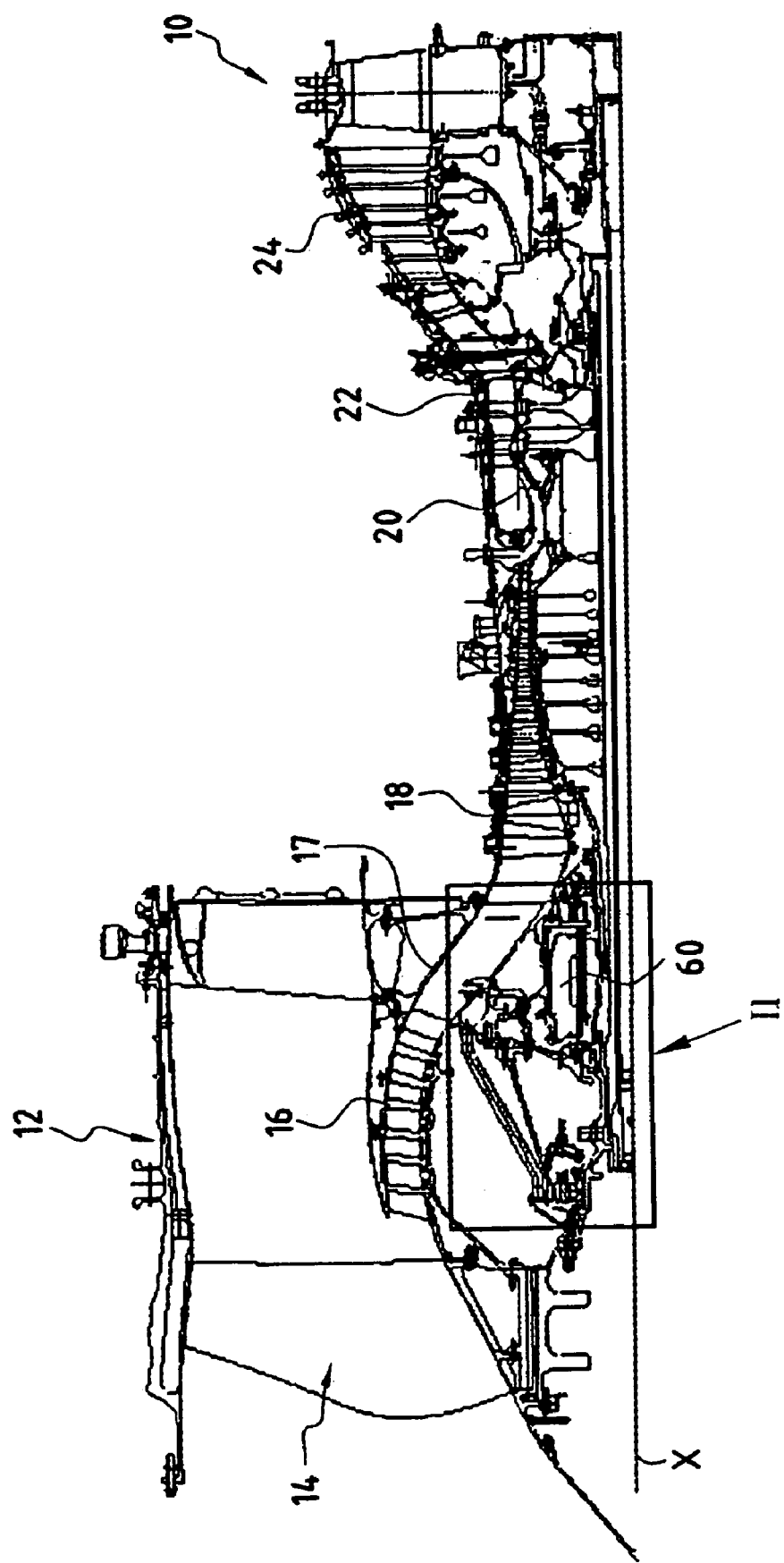
FIG. 1 is a diagrammatic half-section of a two-spool bypass turbojet showing the disposition of an integrated generator of the invention.

FIG. 1 shows a two-spool bypass turbojet 10 on which an electricity generator is arranged at the front in accordance with the present invention.

More precisely, the turbojet 10 of axis X conventionally comprises a peripheral cowl 12 (shown in part) containing, from left to right in FIG. 1 (i.e. from upstream to downstream in the front to rear direction of air flow), and in succession: the fan 14; a low-pressure compressor 16; a high-pressure compressor 18; a combustion chamber 20; a high-pressure turbine 22; and a low-pressure turbine 24.

Finally, in accordance with the present invention, the turbojet 10 is fitted with an electricity generator 60 situated at the front of the turbojet 10 (to the left in FIG. 1) in a zone that is cold.

Figure 2:
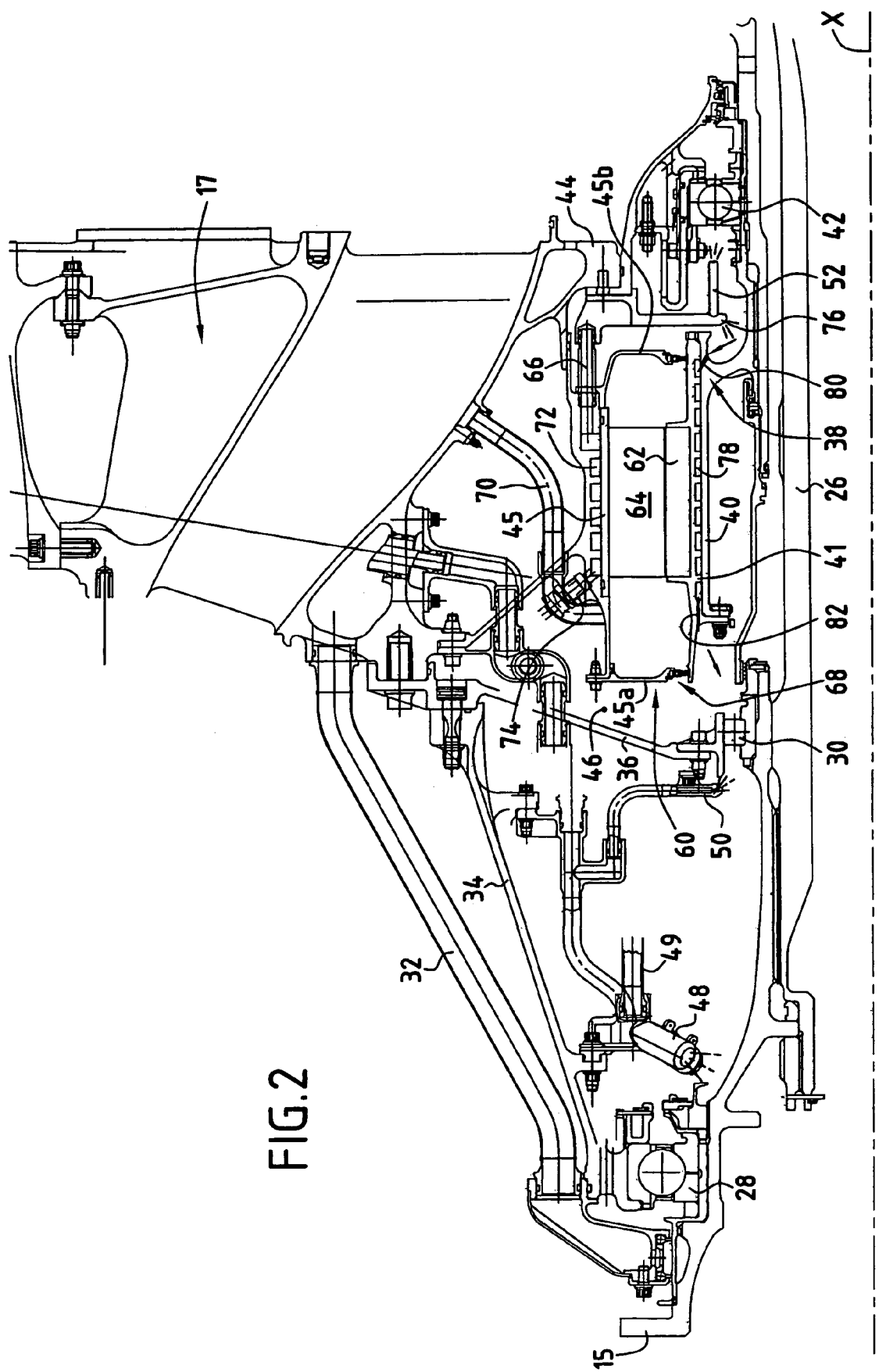
FIG. 2 is a fragmentary view on a larger scale showing the detail II of FIG. 1 and showing the disposition of the generator of the invention on the shaft of the high-pressure rotor.

More precisely, with reference to FIG. 2, it can be seen that the electricity generator 60 is disposed between the low-pressure compressor 16 and the high-pressure compressor 18, level with the intermediate casing 17 between the low-pressure compressor 16 and the high-pressure compressor 18.

This intermediate casing 17 is extended forwards by the outer casing of the low-pressure compressor 16 and rearwards by the outer casing of the high-pressure compressor 18 (see FIG. 1).

The rotor 15 of the low-pressure compressor 16 is connected to the low-pressure turbine 24 situated downstream from the high-pressure turbine 22 by a low-pressure shaft 26 of axis X. The rotor 15 and this low-pressure shaft 26 are connected respectively to the intermediate casing 17 via a front bearing 28 and an intermediate bearing 30.

More precisely, the front bearing 28 is mounted on the rotor 15 and on structural support elements essentially constituted by a front shroud 34, itself secured to the intermediate casing 17. Tubes 32 provide sealing for the gasket situated upstream from the bearing 28.

The intermediate bearing 30 is disposed between the low-pressure shaft 26 and an intermediate shroud 36 mounted securely to the front shroud 34 and to the intermediate casing 17.

A rear bearing 42 is mounted between the high-pressure shaft 38 and a support structure 44 secured to the rear of the intermediate casing 17.

The high-pressure shaft 38 of the high-pressure compressor 18 which extends downstream (to the right of FIG. 2) from the intermediate casing 17 is extended towards the front of the turbojet by a cylindrical shroud 40 lying in the axial plane of the intermediate casing 17. This cylindrical shroud 40 is used for mounting the generator 60 between the front bearing 28 and the rear bearing 42.

It will be understood that the arrangement defined above defines an enclosure 46 formed by an annular space situated between the intermediate casing 17, its support structure 44, the intermediate shroud 36, and the high-pressure shaft 38.

In conventional manner, these various bearings 28, 30, and 42 are lubricated by means of one or more nozzles (respectively the nozzles 48, 50, and 52) which may be connected to a common oil circuit by a network of pipes.

In the present invention, the enclosure 46 situated between the intermediate bearing 30 and the rear bearing 42 is fitted with an electricity generator 60 constituted by a rotor 62 (primary magnetic circuit) and a stator 64 (secondary magnetic circuit).

The rotor 62 is essentially constituted by magnets and it is movable in rotation about the axis X, being secured to the high-pressure shaft 38: for this purpose, the rotor 62 is mounted on a cylindrical support 41 secured to the cylindrical shroud 40.

The stator 64 is constituted essentially by a series of coils, mounted coaxially around the rotor 62 via a removable connection 66 to the support structure 44. More precisely, the stator 64 is mounted directly on a cylindrical support 45, itself secured to the support structure 44. The cylindrical support 45 is coaxial about the cylindrical support 41 of the rotor 62, and has a front end 45a and a rear end 45b.

It will be understood that the electricity generator 60 is located in an enclosure 46 that recovers at least some of the oil delivered by the nozzle 52 sending a jet of oil towards the rear bearing 42.

It will thus be understood that in the enclosure 46, the atmosphere contains a fog of lubricating oil such that the electricity generator 60 must be sealed against this fog of oil.

For this purpose, the following are performed:

the box containing the electricity generator 60 is itself sealed, this box being formed by the cylindrical supports 41 and 45. More precisely, this sealing between the stator 64 and the rotor 62 is achieved by means of two brush gaskets 68 preferably made of carbon: these gaskets 68 are mounted on the front and rear ends of the stator 64 (more precisely on the free edges of the front and rear ends 45a and 45b of the cylindrical support 45) and they bear against the front and rear ends of the cylindrical support 41 for the rotor 62 (this configuration could be reversed); and the space inside the box containing the electricity generator 60 (and defined by the cylindrical support 41 and the cylindrical support 45) is pressurized by means of an auxiliary air feed duct 70 opening out into the wall of the cylindrical support 45.

In this environment, it is also necessary to cool the stator coils 64. This cooling is provided by a first series of helical channels 72 extending from front to rear inside the cylindrical support 45, being fed by an oil feed 74. This first series of helical channels 72 is put into fluid communication with the nozzle 52 used for lubricating the rear bearing 42.

More precisely, the helical channels 72 open out at the rear (to the right in FIG. 2) into a double-headed nozzle comprising the nozzle 52 and a nozzle 76 pointing in the opposite direction to the nozzle 52, i.e. towards the high-pressure shaft 38, for the purpose of cooling the rotor 62.

Provision is made for the oil feed 74 to the first series of helical channels 72 to be fed with oil by an oil circuit in common with the oil feed 49 feeding the nozzles 48 and 50 of the front bearing 28 and the intermediate bearing 30.

In this respect, it should be observed that oil that has passed through the first series of helical channels 72 remains at a temperature that is low enough to enable the rear bearing 42 to be cooled via the nozzle 52.

As a secondary matter, it is also desired to cool the magnets of the rotor 62 by means of a flow of cooling oil through a second series of helical channels 78 disposed between the cylindrical shroud 40 and the cylindrical support 41.

For this purpose, the nozzle 76 for cooling the rotor 62 is situated facing an opening 80 passing through the cylindrical shroud 40 to the second series of helical channels 78, starting from the rear (to the right in FIG. 2).

In this way, all or some of the oil coming from the nozzle 76 penetrates through the opening 80 (see arrow) into the rear end of the second series of helical channels 78 (to the right in FIG. 2).

The front end of the second series of helical channels 78 opens out at the location of an opening 82 serving to expel oil into the enclosure 46 close to the intermediate bearing 30 (see arrow).

It will be understood from the above that it is possible in the arrangement of the present invention, in which an electricity generator 60 is present, to seal the generator even though it is placed in the enclosure 46 in which the atmosphere comprises a fog of oil, while nevertheless continuing to lubricate the various bearings and making use of the lubrication circuit additionally to cool the various portions of the electricity generator.

In this way, the coils of the electricity generator and possibly also the magnets are cooled by the same oil circuit as serves to lubricate the bearings, thus making it possible to ensure that the path followed by the oil pipes within the enclosure are not made any more complex by additional feeds, pipes, and oil recovery points or drains.

The electricity generator 60 may equally well constitute a generator-starter or an auxiliary generator.

It should be observed that adding the electricity generator 60 as a generator-starter or as an auxiliary generator in the engine does not require additional bearings to be included to support the magnetic circuits of the generator.

The embodiment described above with reference to FIGS. 1 and 2 is not limiting on the application of the present invention.

For a turbomachine having a high-pressure spool only, the electricity generator is mounted in the casing of the single axial compressor, upstream from the bearing disposed between the casing and the rotor of the high-pressure compressor, such that the first series of helical channels 72 is extended by a lubricating oil circuit opening out into the nozzle used for lubricating the bearing.

What is claimed is:

1. A turbomachine comprising:
a high-pressure spool having a high pressure compressor of axis X, said high pressure compressor comprising a rotor and a casing,
at least one rear bearing disposed between the casing and the rotor of said high pressure compressor, and
an electricity generator coaxial with said high-pressure spool and including a primary magnetic circuit that is constrained to rotate with said rotor of the high pressure compressor and a secondary magnetic circuit that is secured to said casing,
wherein said electricity generator is disposed in front of said rear bearing in a direction of air flow and wherein said electricity generator includes at least a first cooling circuit surrounding said secondary magnetic circuit and opening out downstream after cooling action into a nozzle for lubricating said rear bearing.

2. A turbomachine according to claim 1, further comprising a combustion chamber and wherein, upstream from said combustion chamber, said high-pressure spool presents said high pressure compressor of axis X for delivering air to said combustion chamber, and downstream from said combustion chamber, said high-pressure spool presents a turbine for receiving hot gas from said combustion chamber for driving the rotor of said high pressure compressor in rotation, said high pressure compressor comprising a plurality of compression stages, each stage presenting a ring of stationary blades secured to said casing and a ring of moving blades extending radially from the periphery of a disk of said rotor.

3. A turbomachine according to claim 1, further comprising a low-pressure spool having a low-pressure compressor disposed upstream from the high-pressure spool, and a low-pressure turbine disposed downstream from the high-pressure spool and serving to drive the rotor of said low pressure compressor in rotation, said low-pressure compressor comprising a plurality of compression stages each presenting a ring of stationary blades and a ring of moving blades extending radially from the periphery of a respective disk of said rotor of said low pressure compressor, said turbomachine further comprising an intermediate casing disposed between the low-pressure compressor and the higher pressure compressor, wherein the secondary magnetic circuit of the electricity generator is secured to said intermediate casing, and wherein said rear bearing is mounted on said intermediate casing.

4. A turbomachine according to claim 3, further comprising at least one front bearing disposed between said intermediate casing and the rotor of said low-pressure compressor, upstream from said electricity generator, and wherein said first cooling circuit is in communication with a lubricating oil circuit of said front bearing.

5. A turbomachine according to claim 4, further comprising a second cooling circuit surrounding said primary magnetic circuit and fed by the feed means connected to the first cooling circuit, said second cooing circuit opening out in the vicinity of said front bearing.

6. A turbomachine according to claim 5, wherein said feed means of the second cooling circuit comprise a lubrication nozzle that, together with said nozzle for lubricating the rear bearing, constitutes a two-headed nozzle.

7. A turbomachine according to claim 5, wherein said second cooling circuit comprises a second series of helical channels.

8. A turbomachine according to claim 1, wherein said electricity generator is configured to operate as a starter.

9. A turbomachine according to claim 1, wherein said electricity generator is configured to operate as an auxiliary electricity generator.

10. A turbomachine according to claim 1, wherein said secondary magnetic circuit is mounted on a cylindrical support, wherein said primary magnetic circuit is mounted on a cylindrical support, and wherein annular sealing means are disposed between the ends of said cylindrical supports, thereby making said electricity generator proof against a lubricating oil atmosphere that surrounds said electricity generator.

11. A turbomachine according to claim 1, wherein said first cooling circuit comprises a first series of helical channels.

12. A turbomachine according to claim 1, wherein said electricity generator is located in an enclosure that recovers at least some oil delivered by said nozzle towards said rear bearing.

13. A turbomachine according to claim 12, wherein said electricity generator is sealed from said oil.

14. A turbomachine according to claim 1, wherein said first circuit comprises channels configured to deliver oil to said nozzle directed toward said rear bearing and to deliver oil to another nozzle directed toward a shaft of said high pressure compressor.

15. A turbomachine according to claim 14, wherein said nozzle and said another nozzle form a double-headed nozzle.

16. A turbomachine according to claim 1, wherein said first cooling circuit includes a same oil for cooling said secondary magnetic circuit and for lubricating said rear bearing.

17. A turbomachine comprising:
a high-pressure spool having a high pressure compressor comprising a rotor and a casing;
at least one rear bearing disposed between the casing and the rotor of said high pressure compressor;
an electricity generator including a primary magnetic circuit configured to rotate with said rotor of the high pressure compressor and a secondary magnetic circuit that is secured to said casing, wherein said electricity generator is disposed upstream from said rear bearing and wherein said electricity generator includes at least a first cooling circuit surrounding said secondary magnetic circuit and opening out downstream from said secondary magnetic circuit into a nozzle for lubricating said rear bearing;
a low-pressure spool having a low-pressure compressor disposed upstream from the high-pressure spool, and a low-pressure turbine disposed downstream from the high-pressure spool and configured to drive the rotor of said low pressure compressor in rotation; and
an intermediate casing disposed between the low-pressure compressor and the higher pressure compressor, wherein the secondary magnetic circuit of the electricity generator is secured to said intermediate casing.

18. A turbomachine according to claim 17, wherein said rear bearing is mounted on said intermediate casing.

19. A turbomachine comprising:
a high-pressure spool having a high pressure compressor comprising a rotor and a casing;
at least one rear bearing disposed between the casing and the rotor of said high pressure compressor; and
an electricity generator including a primary magnetic circuit configured to rotate with said rotor of the high pressure compressor and a secondary magnetic circuit that is secured to said casing,
wherein said electricity generator is disposed upstream from said rear bearing and wherein said electricity generator includes at least a first cooling circuit surrounding said secondary magnetic circuit and opening out downstream from said secondary magnetic circuit into a nozzle for lubricating said rear bearing, and
wherein said secondary magnetic circuit is mounted on a cylindrical support, wherein said primary magnetic circuit is mounted on a cylindrical support, and wherein annular sealing means are disposed between the ends of said cylindrical supports, thereby making said electricity generator proof against a lubricating oil atmosphere.

20. A turbomachine comprising:
a high-pressure spool having a high pressure compressor comprising a rotor and a casing;
at least one rear bearing disposed between the casing and the rotor of said high pressure compressor; and
an electricity generator including a primary magnetic circuit configured to rotate with said rotor of the high pressure compressor and a secondary magnetic circuit that is secured to said casing,
wherein said electricity generator is disposed upstream from said rear bearing and wherein said electricity generator includes at least a first cooling circuit surrounding said secondary magnetic circuit and opening out downstream from said secondary magnetic circuit into a nozzle for lubricating said rear bearing, and wherein said first cooling circuit comprises a series of helical channels.

* * * * *